United States Patent [19]
Barczynski et al.

[11] Patent Number: 5,970,791
[45] Date of Patent: Oct. 26, 1999

[54] ROTARY METER HAVING FLOW CONDITIONING CHAMBERS FOR PRESSURE PULSE REDUCTION

[75] Inventors: John J. Barczynski, Erie, Pa.; Steven L. Johnson, Alpine, Calif.

[73] Assignee: American Meter Company, Erie, Pa.

[21] Appl. No.: 09/069,064

[22] Filed: Apr. 28, 1998

[51] Int. Cl.⁶ .............................. G01F 3/10; F01C 1/18; F04B 11/00
[52] U.S. Cl. .................. 73/261; 418/206.4; 417/540
[58] Field of Search .................. 73/261; 417/540, 417/542; 418/206.4

[56] References Cited

U.S. PATENT DOCUMENTS

| | | |
|---|---|---|
| 2,355,494 | 8/1944 | Yingling . |
| 2,531,726 | 11/1950 | Durdin .................. 418/206.4 |
| 3,810,723 | 5/1974 | Johnson . |
| 4,725,211 | 2/1988 | Gray .................. 418/206.4 |
| 4,823,758 | 4/1989 | Tamura et al. . |
| 5,050,094 | 9/1991 | Kitano . |
| 5,207,088 | 5/1993 | Geery . |

Primary Examiner—Harshad Patel
Attorney, Agent, or Firm—Edward W. Goebel, Jr.; MacDonald, Illig, Jones and Britton LLP

[57] ABSTRACT

An improved rotary fluid meter is provided having expansion chambers for conditioning pressure pulses that may occur in the flow of fluids. The pressure pulses, which inhibit the meter's ability to accurately measure, may originate from within a metering device or from without it. The pressure pulses may be generated upstream of the meter. Fluid flows into the meter through a fluid flow conduit. At least one flow conditioning chamber which is of such a volume and a shape as to enable it to substantially dampen pressure pulses so as to improve the accuracy of the rotary meter is provided along the fluid flow conduit.

25 Claims, 4 Drawing Sheets

ROTARY METER HAVING FLOW CONDITIONING CHAMBERS FOR PRESSURE PULSE REDUCTION

BACKGROUND OF INVENTION

This invention relates to rotary positive displacement fluid meters, and more particularly, it relates to rotary meters which measure the flow of gas.

Rotary meters are used for commercial, residential and industrial buildings, as well as other locations to measure the amount gas which is consumed. Public utilities and other providers of gases use the measurements to bill customers. Public utility commissions in many states require the overall accuracy of all gas meters to be approximately one hundred percent with a permissible error of ±1% at all gas flow rates. Since the operation of various components within gas meters and gas meter installations make inaccuracies inherent, the designers and manufacturers of gas meters are faced with minimizing these effects.

Rotary positive displacement meters measure the flow of fluids such as natural gas through the use of one or more impellers installed in an impeller cavity located in a meter casing. The impeller cavity is in the path of the flow of gas through the casing. Thus, the flow of gas through the path rotates the impeller(s). The single or multiple impellers used in rotary meters normally have what is called a "figure-eight" or an "hour-glass" shape. As gas flows through the casing, the impeller(s) trap a known quantity of gas in a measuring chamber which is formed between the impeller(s) and an inner wall of the impeller cavity. Each total revolution of an impeller causes a number of these known quantities of gas to be accumulated in the measuring chamber and passed through the rotary meter. The number of rotations of the impellers is counted on a register and totalled to determine the amount of gas flowing through the rotary meter.

A cross-section of a typical prior art rotary positive displacement meter 20 is shown in FIG. 1A–1D. The rotary meter 20 includes a casing or housing 22 having a fluid flow conduit 24 through which fluid is passed into the meter, which is measured and is passed out of the meter. The fluid flow conduit 24 includes a flow inlet channel 26 for gas intake, an inlet expansion chamber 28, an impeller cavity 30, an outlet expansion chamber 32 and an outlet channel 34 for gas expulsion. The impeller cavity 30 has an inner wall 33 extending around its periphery.

A pair of identical, figure-eight shaped impellers 36 and 38 is mounted within the impeller cavity 30. For the convenience of following the rotation of the impellers in FIG. 1A–1D, the ends of the impeller 36 are marked A and B, while the ends of impeller 38 are marked C and D. The impellers 36 and 38 are constructed to rotate within the impeller cavity so that their ends pass in close proximity to the inner wall 33.

The pressure drop across the gas meter 20 as gas is consumed downstream of the meter 20 causes the upper impeller 36 to rotate in a clockwise direction, while the lower impeller 38 is rotated in a counter-clockwise direction. As explained above, in the course of this rotation, the figure-eight shaped impellers 36 and 38 each periodically forms a closed measuring chamber of a known volume between itself and a portion of the inner wall 33. As a result, the rotating impellers 36 and 38 separate the flowing gas stream into a series of pulses of a known volume of gas as the gas passes through the meter 20. This operation of the rotary meter 20 is shown in FIG. 1A through 1D and explained as follows:

Referring first to FIG. 1A, as the bottom impeller 38 rotates in a counter-clockwise direction toward the horizontal position, gas enters from the inlet channel 26 and the inlet expansion chamber 28 to a space between the lower impeller 38 and the inner wall 33 of the impeller cavity 30. Upper impeller 36 prevents gas from flowing from the input expansion chamber 28 and through the impeller cavity 30. A previously trapped pulse of gas is being released from between impeller 36 and a portion of innerwall 33 toward exit expansion chamber 32.

When impeller 38 reaches the horizontal position shown in FIG. 1B, a known volume of gas is trapped in a measuring chamber 40 between impeller 38 and the inner wall 33. Impeller 36 is in the vertical position and continues to block the flow of gas from beyond the impeller cavity 30.

As the impeller 38 continues to turn in the counterclockwise direction, FIG. 1C shows the volume of fluid trapped in the measuring chamber 40 is discharged as a pulse through the outlet expansion chamber 32 and the outlet channel 34. Gas from the inlet expansion chamber 28 is now becoming trapped in a closing space between the top impeller 36 and the inner wall 33. Impeller 38 prevents additional gas from flowing from the inlet channel 26 and inlet expansion chamber 28 through the meter 20.

FIG. 1D shows that as the impeller 36 rotates in the clockwise direction it reaches its horizontal position at which it confines another known volume of fluid in a measurement chamber 42 between it and a portion of the inner wall 33. The measuring chamber 42 is the same size as the measuring chamber 40. The balance of the gas that was in the measurement chamber 40 is discharged from the meter 20, as the impeller 38 continues to prevent additional gas from flowing from the inlet expansion chamber 28. The gas in the measurement chamber 42 is then discharged as a pulse as the impeller 36 continues to rotate toward the position shown in FIG. 1A.

This process is repeated twice for each complete revolution of the impellers 36 and 38. During each rotation, the upper impeller 36 fills and empties its measurement chamber twice, as does the lower impeller 38. Ideally, no gas will pass from the inlet connection to the outlet connection without being trapped in the measurement chambers 40 and 42.

While rotary meters are of great utility, the pressure pulses discussed above are felt throughout the length of the meter case as well as the whole meter installation. These pressure pulses lead to meter inaccuracies. Each complete rotation of the impellers 36 and 38 produces four pressure pulses in the gas stream as the measurement chambers 40 and 42 each fill and empty twice during each rotation of the impellers. Therefore, the frequency of the pulsations will be four times the frequency of the rotations of the impellers 36 and 38. As the gas flow rate increases, rotation rates of the impellers 36 and 38 increase, gas pressure pulses are more frequent, and inaccuracies due to gas pressure pulses become more significant.

Prior to this invention, rotary gas meters having inherent inaccuracies due to gas pressure pulses were installed to measure the flow of gas. One U.S. Pat. No. 5,207,088 dealt with the effects of these pulses by eliminating accuracy errors caused by standing waves of sound produced by these pulses in configurations used for testing the accuracy of the rotary gas meter. Where a rotary meter to be tested was connected to a prover master meter by a conduit, the testing configuration included at least one expansion chamber having a cross-sectional area at least seven times as great as the cross-sectional area of the conduit. This expansion chamber reportedly eliminated the standing waves produced by gas pressure pulses at various harmonics of the frequency of these pulses as the flow rate of gas increased during the testing of the rotary meter. However, this expansion chamber was not used once the testing of meter accuracy was completed during initial calibration. The effects of gas pulses on the accuracy of a rotary meter after it was installed were left unchecked and unchanged.

Additionally, it is often desirable to attempt to reduce the cost of a rotary meter by manufacturing its casing through the use of an extrusion process. During the extrusion process, an ingot of metal from which the meter casing is to be manufactured is driven through a die to form the casing. Referring to the meter casing 22 shown in FIG. 1A, the hollow area comprising the impeller cavity 30, the inlet expansion chamber 28, and the outlet expansion chamber 32 is formed by inserting a core plunger having the shape of the cross-section of these hollow areas into a heated ingot before the ingot is driven through the die which forms the casing. Because substantial pressures are produced during the extrusion process, the cross-sectional area of the core plunger must be of a size to resist being damaged as the ingot is being driven through the dye.

Furthermore, the cost of a meter casing can be further reduced when the hollow areas in the casing are larger. Larger hollow areas result in the use of less material, thus reducing the cost of the meter casing. However, to be discussed later, there are practical limitations on how large one may make the flow conditioning chamber. For this reason it is desirable to have the hollow areas of the casing as large as practicable for the design of a rotary meter.

SUMMARY OF THE INVENTION

A conventional rotary meter has a casing with a fluid flow conduit which includes an impeller cavity having a flow inlet channel on one side of it and a flow outlet channel on the other side of it. The impeller cavity has an inner wall about its periphery. At least one rotatable impeller is mounted in the rotary meter so that it rotates within the impeller cavity. The impeller or impellers which are used in the rotary meter have a shape which enables them to periodically form a substantially fluid tight measurement chamber of a known volume with the inner wall during the rotation of the impeller with the impeller cavity.

In accordance with this invention, the fluid flow conduit includes at least one flow conditioning chamber which is of such a volume and shape as to enable it to substantially dampen pressure pulses produced as the impeller or impellers rotate within the impeller cavity as well as dampen pressure pulses produced outside the meter, prior to gas measurement, so as to improve the accuracy of the rotary meter.

One preferred embodiment of this invention includes an inlet flow conditioning chamber located along the flow inlet channel and an outlet flow conditioning chamber located in the flow outlet channel. The flow conditioning chambers can have a volume which is at least approximately twice the volume of the measurement chamber to a volume of not more than approximately seven times the volume of the measurement chamber. It can be particularly advantageous for the flow conditioning chambers in the flow inlet channel and in the flow outlet channel to have a volume of between at least about two and one half times the volume of the measurement chamber to not more than about three and one half times the volume of the measurement chamber. When the flow conditioning chamber has a volume above 3½ times the volume of the measurement chamber the dampening effect will still continue to improve but the improvement will be very small. In the preferred embodiment of this invention flow conditioning chambers have a cross-sectional shape which includes a substantially descending profile that tilts inwardly toward the impeller cavity at an angle of about 20° to an angle of about 40°.

This invention does not reside in any one of the features of the rotary meter disclosed above and in the Description of the Preferred Embodiments and claimed below. Rather, this invention is distinguished from the prior art by its particular combination of features of a rotary meter. Important features of this invention have been disclosed in the detailed description of the preferred embodiments of this invention. These are shown and described below to illustrate the best mode contemplated to date of carrying out this invention.

Those skilled in the art will realize that this invention is capable of embodiments which are different from those shown and that the details of the structure of the rotary meter can be changed in various ways without departing from the scope of this invention. Accordingly, the drawings and description are to be regarded as illustrative in nature and are not to restrict the scope of this invention. Thus, the claims are to be regarded as including such equivalent positive displacement meters as do not depart from the spirit and scope of the invention.

BRIEF DESCRIPTION OF THE DRAWINGS

For a more complete understanding and appreciation of this invention and its many advantages, preference will be made to the following, detailed description of this invention taken in conjunction with the accompanying drawings in which.

DETAILED DESCRIPTION OF PREFERRED EMBODIMENT

Figure 1A:
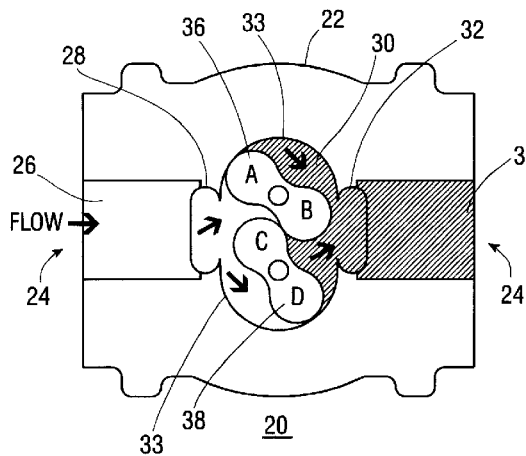
FIG. 1A–1D are cross-sectional views of a prior art rotary meter showing how it operates.
Figure 1B:
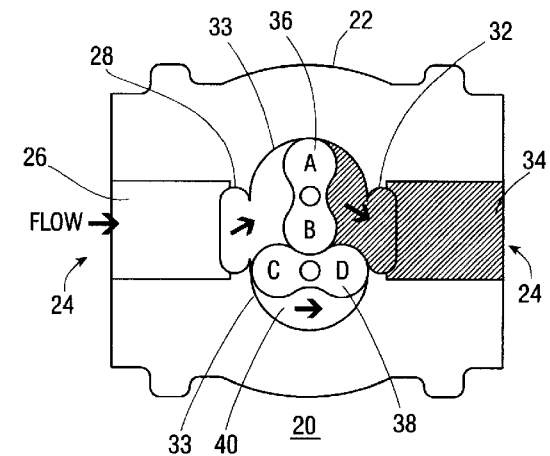
Figure 1C:
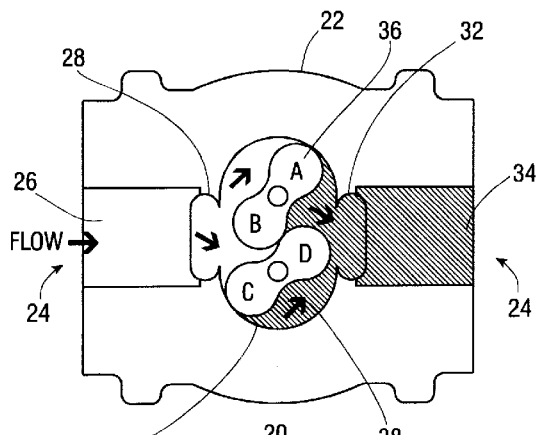
Figure 1D:
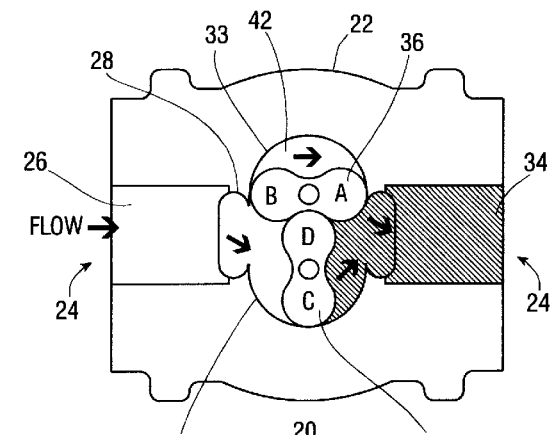
Figure 2:
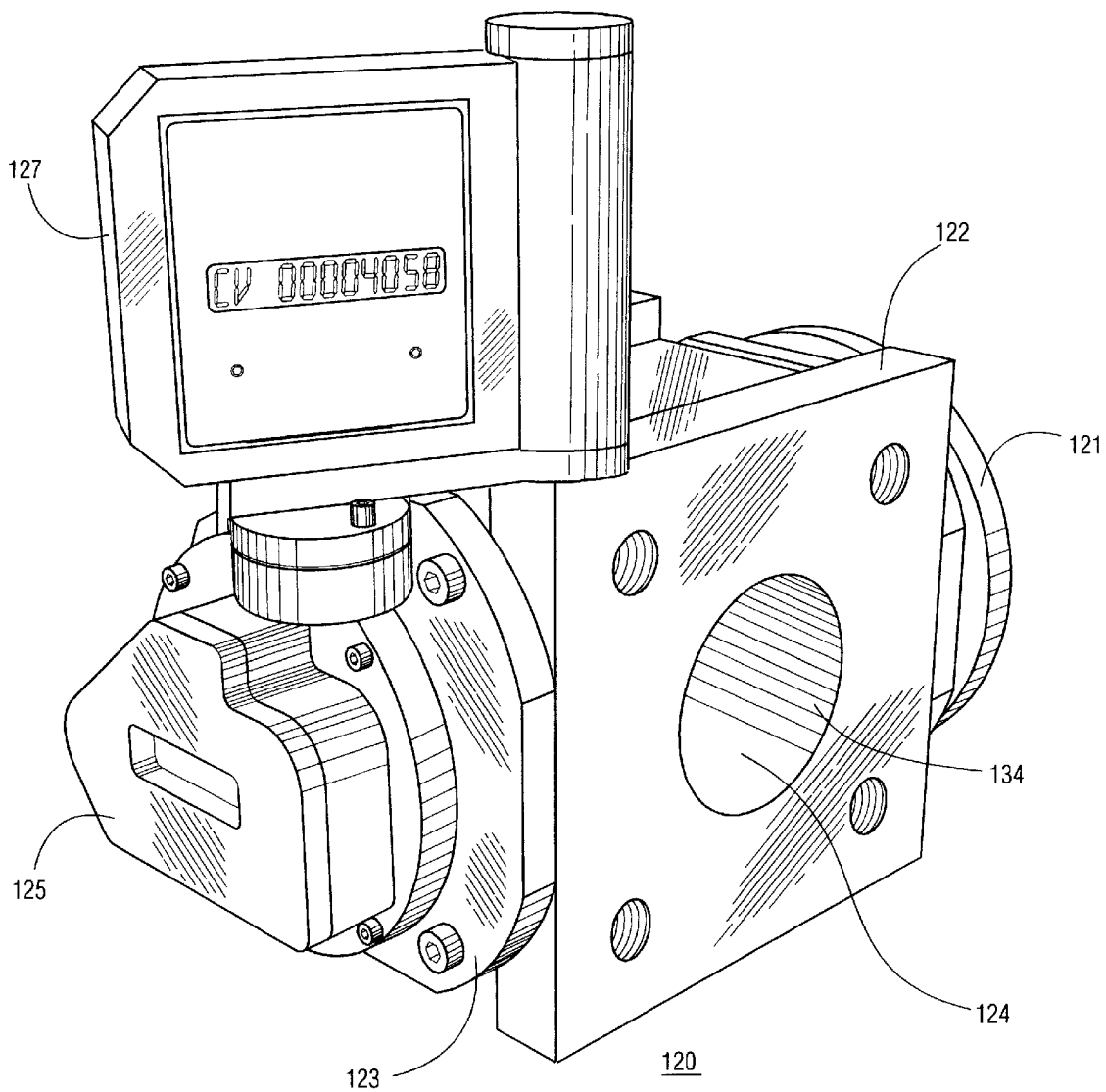
FIG. 2 is perspective view of a rotary meter which can be constructed in accordance with the principles of this invention.

FIG. 2 shows a rotary meter 120 of the type that can be constructed in accordance with the principles of this invention. The rotary meter 120 is shown to include a casing 122 having a casing cover 121 located at one end and a casing cover 123 located at its other end. The casing cover 121 would normally enclose a timing gear assembly used to synchronize rotation of impellers within the rotary meter. A register cover 125 is attached to the casing cover 123 and encloses an index or register used to count the rotations of the impellers within the rotary meter 120. The register converts these rotations to a totalized volume of gas flowing through the meter 120.

An instrument 127 is shown mounted on the register cover 125. Rotary meters can include electronic instruments which perform functions as compensating the output of the meter for temperature and pressure and transmitting meter readings to remote locations. Also, an instrument drive plate is optionally provided to interface with other types of instruments.

The rotary meter 120 has a fluid flow conduit 124 which includes an outlet channel 134 which is shown in FIG. 2. However, FIG. 3 must be referred to for an understanding of this invention.

Figure 3:
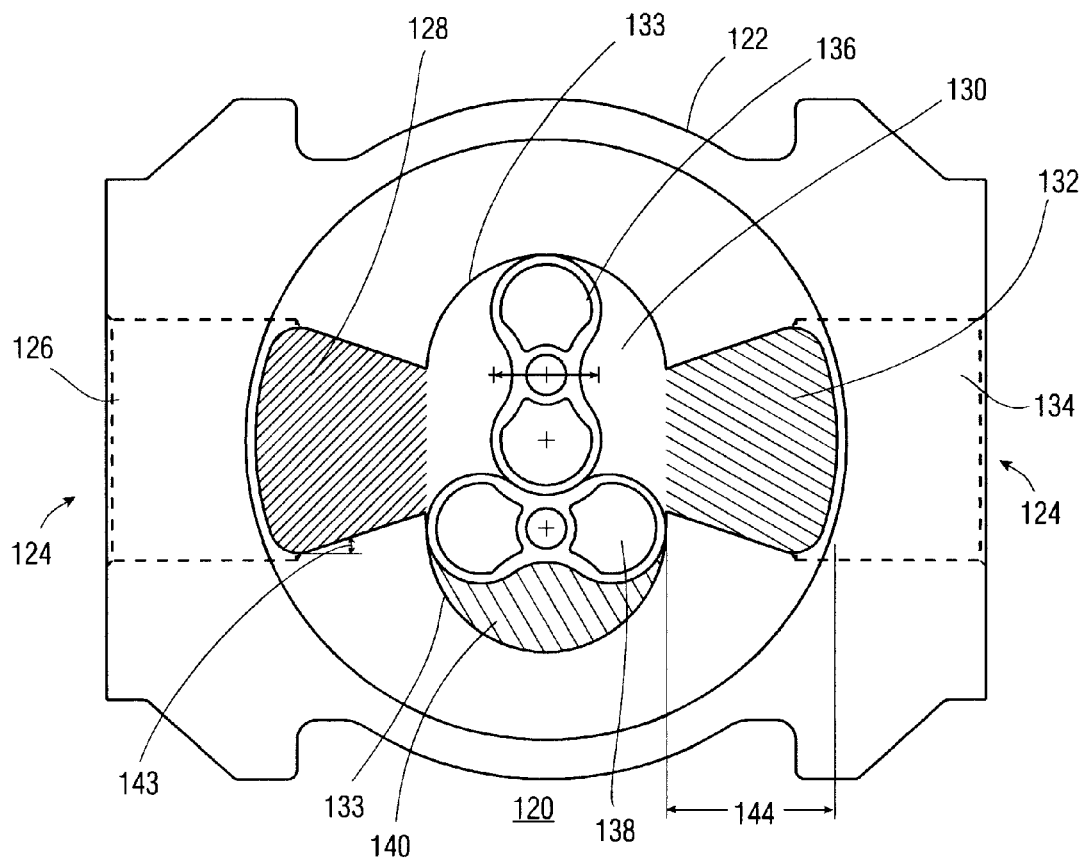
FIG. 3 is a cross-sectional view of a rotary meter constructed in accordance with the principles of this invention.

A cross-section of the rotary positive displacement meter 120 of this invention is shown in FIG. 3. The fluid flow conduit 124 of the casing 122 is shown to include a flow inlet channel 126 to take in gas or other fluid, an inlet flow conditioning chamber 128 constructed in accordance with this invention, an impeller cavity 130, an outlet flow conditioning chamber constructed in accordance with this invention, and the outlet channel 134 through which gas or other fluid is expelled from the rotary meter 120. The impeller cavity 130 has an inner wall 133 extending around its periphery.

The rotary meter 120 includes at least one impeller mounted in it to rotate within the impeller cavity 130. The preferred embodiment of this invention shown in FIG. 3 includes a pair of identical impellers 136 and 138 which are shown to have a figure-eight shape. The impellers 136 and 138 rotate within the impeller cavity 130 so that their ends pass in close proximity to the inner wall 133. The rotary meter may, of course, use one or more than two impellers, if desired. Each impeller may have any shape required for its satisfactory operation of the meter.

As shown in FIG. 3 the positions of the impellers 136 and 138 are such that impeller 138 is in a horizontal position which causes it to form a measurement chamber 140 with the inner wall 133 of the impeller cavity 130. As explained above with regard to the prior art rotary meter 20, gas passing through the meter 120 is periodically trapped in this measurement chamber 140, and in a similar measurement chamber formed at the top of the impeller cavity 130 by the impeller 136 enabling the amount of gas being used at a particular location to be measured.

In accordance with this invention, the fluid flow conduit 124 must include at least one flow conditioning chamber which is of such a volume and shape as to enable this chamber or chambers to substantially dampen pressure pulses. These pressure pulses are produced as one or more impellers within the rotary meter rotate within the impeller cavity of the meter. Also, pressure pulses are generated outside the meter prior to gas measurement. Substantially dampening pressure pulses with one or more flow conditioning chambers in the fluid flow conduit 124 improves the accuracy of the rotary meter 120. The preferred embodiment of this invention shown in FIG. 3 includes the inlet flow conditioning chamber 128 located between the inlet channel 126 and the impeller cavity 130 and an outlet flow conditioning chamber 132 located between the impeller cavity 130 and the outlet channel 134. The flow conditioning chambers 128 and 132 in the preferred embodiment of the invention each have a volume which is at least about two and one half times the volume of the measurement chamber 140. It is believed that where the meter casing 122 is extruded an optimum size of the flow conditioning chambers 128 and 132 to accommodate a core plunger would be from about two and one half times to about three and one half times the volume of the measurement chamber 140.

As a general rule a larger flow conditioning chamber provides a greater ability to dampen the pressure pulsations, but at a diminished capacity. From a practical standpoint, significant accuracy improvement can be obtained with the use of a pair of flow conditioning chambers each having a volume which is at least about two and one half (2½) times the volume of the measurement chamber 140, but not greater than about three and one half (3½) times the volume of the measurement chamber 140. Where the volume of a flow conditioning chamber is greater than seven (7) times the volume of the measurement chamber 140, the flow conditioning chambers will still dampen pressure pulses but the benefit of dampening will not be as great per unit of volumetric increase. Little is to be gained in the way of improved dampening qualities in meters having flow conditioning chambers more than seven (7) times the volume of the measurement chamber. Therefore, meters with flow conditioning chambers more than seven (7) times larger than measurement chambers are not practical to produce due to the large meter body cross-sections involved (at least as to casing sizes currently on the market). These larger volume flow conditioning chambers are very difficult to keep uniform in construction and could not be extruded economically in meters currently being marketed. Furthermore, a large increase in the meter body cross-section would prevent the rotary meter from being interchangeable with the prior art. There is a desire to make the meter of the present invention compatible with present installations. Obviously, however, if one were to increase the size of the casing as compared to meters currently on the market, flow conditioning chambers over seven (7) times the measurement chamber will be possible.

Those skilled in the art will recognize that in accordance with the principles of this invention flow conditioning chambers having a number of shapes can be used to dampen the pulses produced by the rotary meters and thus enhance the accuracy of these meters. However, in the preferred embodiment of this invention it was found that effective flow conditioning chambers 128 and 132 had a maximum height which was approximately the diameter of the inlet channel 126 and the outlet channel 134, respectively. The shape of the cross-section of the flow conditioning chambers 128 and 132 has a profile that tilts toward the impeller cavity 130, with the angle 143 between a side of an expansion chamber and the horizontal ranging from about 20° to about 40°. It is contemplated that good results can be obtained by having a pair of expansion chambers having a length 144 which is from about one half to about twice the width 145 of the impellers 136 and 138.

Figure 5:
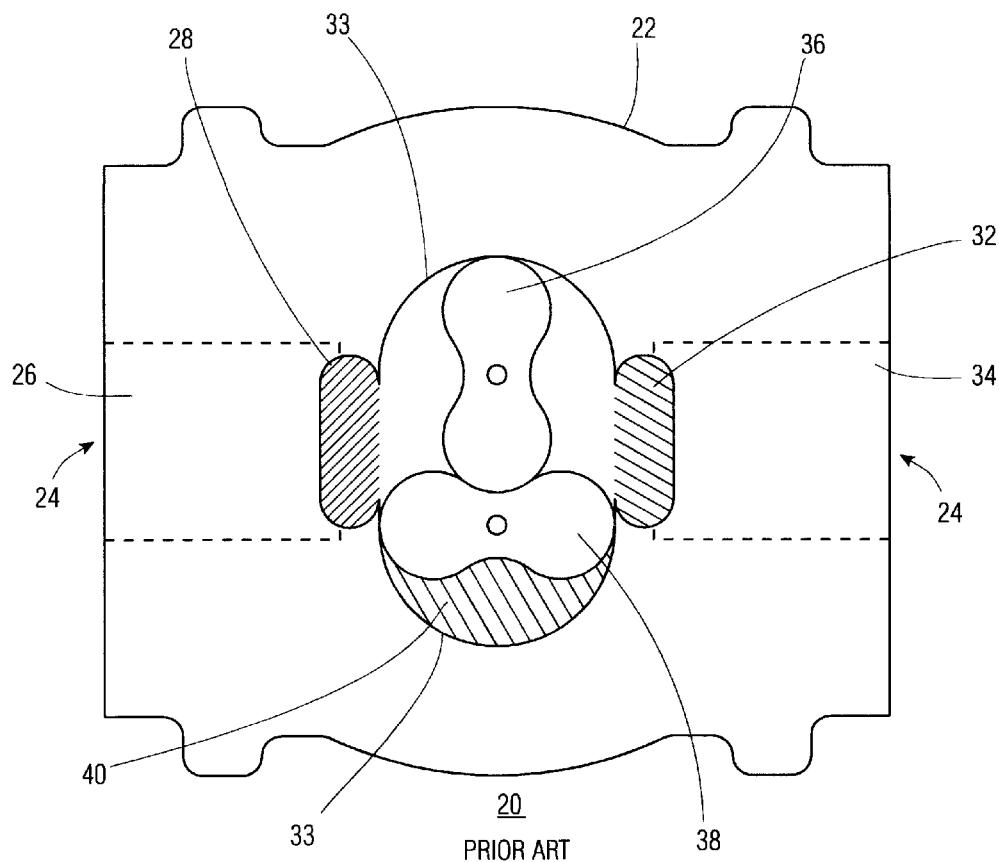
FIG. 5 is an enlarged cross-sectional view of a prior art rotary meter having its impellers in the position shown in FIG. 1B.

FIG. 5 shows a prior art rotary meter which was described above with regard to FIGS. 1A–1D. The expansion chambers 28 and 32 each had a size ranging from about 0.85 to about 1.5 times the volume of the measuring chamber 40. No appreciable improvement in the accuracy of the meter was recognized from the use of expansion chambers of this size range.

Figure 4:
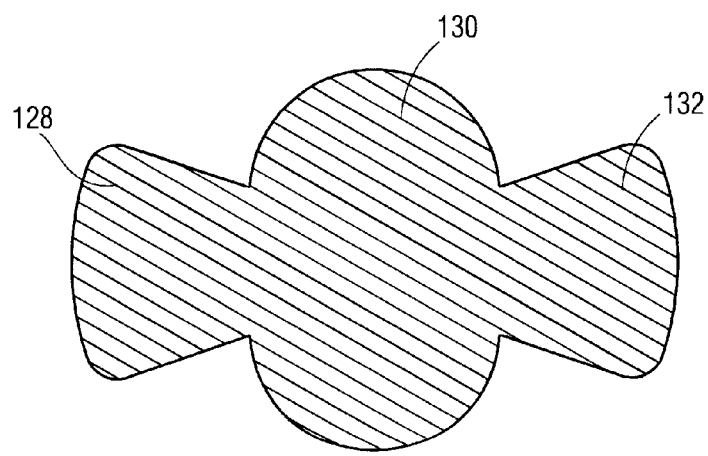
FIG. 4 is a cross-sectional view of the hollow areas of the rotary meter shown in FIG. 3.
Figure 6:
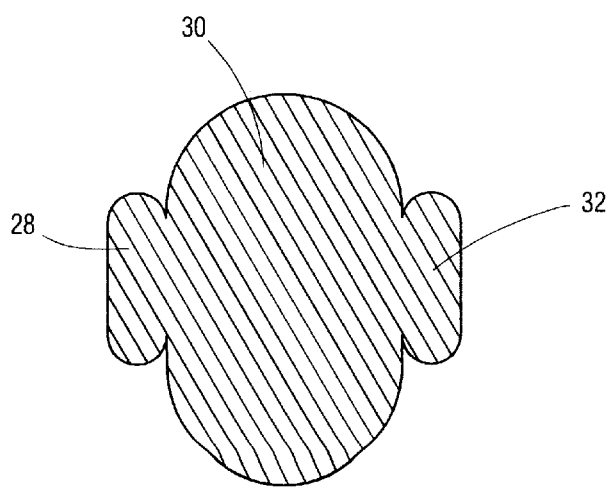
FIG. 6 is a cross-sectional view of the hollow areas of the prior art meter shown in FIG. 5.

FIG. 4 is a cross-sectional view of the hollow areas of the rotary meter shown on FIG. 3 consisting of the impeller chamber 130, the inlet expansion chamber 128 and the outlet expansion chamber 132. FIG. 4 should be compared to FIG. 6 which is a cross-section of the power areas of a typically prior art rotary meter shown in page 5, consisting of impeller chamber 30 and the inlet expansion chamber 28 and the outlet expansion chamber 32. The increased size of the flow conditioning chambers 128 and 132 when compared with the expansion chambers 28 and 32, provide two advantages in addition to improvement in the accuracy of the rotary meter 120. The larger flow areas result in the use of less metal to manufacture the casing 122 of the rotary meter 120 than would be used to manufacture the casing 22 of a comparable prior art rotary meter 20 shown in FIG. 5. This results in a reduction in the cross of the rotary meter 120 vis-a-vis a similar sized prior art rotary meter 20 shown in FIG. 5.

Additionally, the rotary meter 120 shown in FIG. 3 can more readily be manufactured by an extrusion process than can the prior art rotary meter 20 shown in FIG. 5. The increased size of the flow conditioning chambers 128 and 132 with respect to the expansion chambers 28 and 32 of the meter 20 in FIG. 5 facilitate the insertion of a core plunger the size of the hollow areas shown in FIG. 4 into a hot ingot before the ingot is driven through a die to form the casing 122 using the extrusion process. A core plunger of the size of the hollow areas shown in FIG. 4 can more reliably resist being damaged as the ingot is being driven through the die to extrude the meter casing 122 show in FIG. 3.

Those skilled in the art will recognize that this invention has been explained with regard to the details and arrangements of the illustrated embodiment to explain the nature of this invention. Many modifications can be made to this invention by those skilled in the art without departing from the its spirit and scope. Thus, the claims are intended to be interpreted to cover such equivalent rotary meters which do not depart from the spirit and scope of this invention.

I claim:

1. A rotary meter, the improvement comprising:
   a casing having a fluid flow conduit which includes an impeller cavity, a flow inlet channel connected to said impeller cavity, and a flow outlet channel connected to said impeller cavity; said impeller cavity having an inner wall;
   at least one rotatable impeller mounted in said rotary meter so as to rotate within said impeller cavity; said impeller having a shape which enables it, during its rotation within said impeller cavity, to form with said inner wall a substantially fluid-tight measurement chamber having a known volume; and
   said fluid flow conduit further including at least one flow conditioning expansion chamber having a shape and a volume sufficiently larger than the measurement chamber so as to enable it to substantially dampen pressure pulses so as to improve the accuracy of the rotary meter.

2. The rotary meter of claim 1, wherein each said at least one flow conditioning expansion chamber has a volume which is at least about two and one half (2½) times the volume of said measurement chamber.

3. The rotary meter of claim 1, wherein each said at least one flow conditioning expansion chamber has a volume which is at least about two and one-half (2½) times the volume of said measurement chamber, and each said at least one flow conditioning expansion chamber has an individual volume of not more than about seven (7) times the volume of said measurement chamber.

4. The rotary meter of claim 1 wherein each said at least one flow conditioning expansion chamber has a volume which is at least about two and one-half (2½) times the volume of said measurement chamber, and wherein each said at least one flow conditioning expansion chamber has an individual volume of not more than about three and one-half (3½) times the volume of said measurement chamber.

5. The rotary meter of claim 1 wherein each of said at least one flow conditioning expansion chamber has a cross-sectional shape which is a substantially descending profile toward said impeller cavity, wherein each of said at least one flow conditioning expansion chambers descends at substantially a 20 to 40° angle inward toward said impeller cavity, and wherein each of said at least one flow conditioning expansion chambers has an outer edge with respect to said measurement chamber which is substantially the same size as the flow inlet channel of said fluid flow conduit.

6. The rotary meter of claim 1, wherein there is a plurality of flow conditioning expansion chambers.

7. The rotary meter of claim 6, wherein there is one flow conditioning expansion chamber located along the flow inlet channel and one flow conditioning expansion chamber located along the flow outlet channel.

8. The rotary meter of claim 7, wherein each of said flow conditioning expansion chambers has a volume which is at least about two and one half (2½) times the volume of said measurement chamber.

9. The rotary meter of claim 7, wherein each of said flow conditioning expansion chambers has a volume which is at least about two and one-half (2½) times the volume of said measurement chamber, and each of said flow conditioning expansion chambers has an individual volume of not more than about seven (7) times the volume of said measurement chamber.

10. The rotary meter of claim 7 wherein each of said at flow conditioning expansion chambers has a volume which is at least about two and one-half (2½) times the volume of said measurement chamber, and wherein each of said flow conditioning expansion chambers has an individual volume of not more than about three and one-half (3½) times the volume of said measurement chamber.

11. The rotary meter of claim 7 wherein each of said flow conditioning expansion chambers has a cross-sectional shape which is a substantially descending profile toward said impeller cavity, wherein said flow conditioning expansion chambers descend at substantially a 20 to 40° angle inward toward said impeller cavity, and wherein each of said flow conditioning expansion chambers has an outer edge with respect to said measurement chamber which is substantially the same size as the flow inlet channel of said fluid flow conduit.

12. A rotary meter, the improvement comprising:
   a casing having a fluid flow conduit which includes an impeller cavity, a flow inlet channel connected to said impeller cavity, and a flow outlet channel connected to said impeller cavity; said impeller cavity having an inner wall;
   a plurality of hour-glass shaped impellers mounted in said rotary meter so as to rotate within said impeller cavity; said impellers having a shape which enables them, during their rotation within said impeller cavity, to form with said inner wall a substantially fluid-tight measurement chamber having a known volume;
   said fluid flow conduit further including at least one flow conditioning expansion chamber having a shape and a volume sufficiently larger than the measurement chamber so as to enable it to substantially dampen pressure pulses so as to improve the accuracy of the rotary meter; and
   wherein the fluid to be measured is a gas and not a liquid.

13. The rotary meter of claim 12, wherein there is a plurality of flow conditioning expansion chambers.

14. The rotary meter of claim 12, wherein one flow conditioning expansion chamber is located along the flow inlet channel and one flow conditioning expansion chamber is located along the flow outlet channel.

15. The rotary meter of claim 12, wherein said at least one flow conditioning expansion chamber has a volume which is at least about two and one half (2½) times the volume of said measurement chamber.

16. The rotary meter of claim 12, wherein each said at least one flow conditioning expansion chamber has a volume which is at least about two and one-half (2½) times the volume of said measurement chamber, and each said at least one flow conditioning expansion chamber has an individual volume of not more than about seven (7) times the volume of said measurement chamber.

17. The rotary meter of claim 12 wherein each said at least one flow conditioning expansion chamber has a volume which is at least about two and one-half (2½) times the volume of said measurement chamber, and wherein each said at least one flow conditioning expansion chamber has a volume of not more than about three and one-half (3½) times the volume of said measurement chamber.

18. A rotary meter, the improvement comprising:

a casing having a fluid flow conduit which includes an impeller cavity, a flow inlet channel connected to said impeller cavity, and a flow outlet channel connected to said impeller cavity; said impeller cavity having an inner wall;

a plurality of hour-glass shaped impellers mounted in said rotary meter so as to rotate within said impeller cavity; said impellers having a shape which enables them, during their rotation within said impeller cavity, to form with said inner wall a substantially fluid-tight measurement chamber having a known volume;

an inlet flow conditioning expansion chamber located along the flow inlet channel of said fluid flow conduit;

an outlet flow conditioning expansion chamber located along the flow outlet channel of said fluid flow conduit;

said flow conditioning expansion chambers having a shape and a volume sufficiently larger than the measurement chamber so as to enable them to substantially dampen pressure pulses so as to improve the accuracy of the rotary meter;

each of said flow conditioning expansion chambers having a cross-sectional shape which is a substantially descending profile toward said impeller cavity wherein said flow conditioning expansion chambers descend at substantially a 20 to 40° angle inward toward said impeller cavity wherein each of said flow conditioning expansion chambers has an outer edge with respect to said measurement chamber which is substantially the same size as the flow inlet channel of said fluid flow conduit; and wherein the fluid to be measured is a gas and not a liquid.

19. The rotary meter of claim 18, wherein each of said flow conditioning expansion chambers has a volume which is at least about two and one half (2½) times the volume of said measurement chamber.

20. The rotary meter of claim 18, wherein each of said flow conditioning expansion chambers has a volume which is at least about two and one-half (2½) times the volume of said measurement chamber, and each of said flow conditioning expansion chambers has an individual volume of not more than about seven (7) times the volume of said measurement chamber.

21. The rotary meter of claim 18 wherein each of said flow conditioning expansion chambers has a volume which is at least about two and one-half (2½) times the volume of said measurement chamber, and wherein each of said flow conditioning expansion chambers an individual volume of not more than about three and one-half (3½) times the volume of said measurement chamber.

22. A rotary meter, the improvement comprising:

a casing having a fluid flow conduit which includes an impeller cavity, a flow inlet channel connected to said impeller cavity, and a flow outlet channel connected to said impeller cavity; said impeller cavity having an inner wall;

a plurality of hour-glass shaped impellers mounted in said rotary meter so as to rotate within said impeller cavity; said impellers having a shape which enables them, during their rotation within said impeller cavity, to form with said inner wall a substantially fluid-tight measurement chamber having a known volume;

an inlet flow conditioning expansion chamber located along the flow inlet channel of said fluid flow conduit;

an outlet flow conditioning expansion chamber located along the outlet channel of said fluid flow conduit;

said flow conditioning expansion chambers having a shape and a volume sufficiently larger than the measurement chamber so as to enable them to substantially dampen pressure pulses so as to improve the accuracy of the rotary meter;

each of said flow conditioning expansion chambers having a cross-sectional shape which is a substantially descending profile toward said impeller cavity wherein said flow conditioning expansion chambers descend at substantially a 20 to 40° angle inward toward said impeller cavity wherein each of said flow conditioning expansion chambers has an outer edge with respect to said measurement chamber which is substantially the same size as the flow inlet channel of said fluid flow conduit;

each of said flow conditioning expansion chambers having a substantially uniform width, the width of said flow conditioning expansion chambers being one-half (½) to two (2) times the diameter of said impellers; and wherein the fluid to be measured is a gas and not a liquid.

23. The rotary meter of claim 22, wherein each of said flow conditioning expansion chambers has a volume which is at least about two and one half (2½) times the volume of said measurement chamber.

24. The rotary meter of claim 22, wherein each of said flow conditioning expansion chambers has a volume which is at least about two and one-half (2½) times the volume of said measurement chamber, and each of said flow conditioning expansion chamber has a volume of not more than about seven (7) times the volume of said measurement chamber.

25. The rotary meter of claim 22 wherein each of said flow conditioning expansion chambers has a volume which is at least about two and one-half (2½) times the volume of said measurement chamber, and wherein each of said flow conditioning expansion chambers has an individual volume of not more than about three and one-half (3½) times the volume of said measurement chamber.

* * * * *